(12) United States Patent
Flammer et al.

(10) Patent No.: US 7,089,806 B2
(45) Date of Patent: Aug. 15, 2006

(54) DEVICE AND METHOD FOR MEASURING TORQUE ON AN ELECTRIC MOTOR

(75) Inventors: Hermann Flammer, Zimmern-Floezlingen (DE); Hubert Hauser, Balgheim (DE); Norbert Irmer, Villingen-Schwenningen (DE); Guido Schmid, Triberg (DE)

(73) Assignee: Minebea Co., Ltd., Miyota-machi (JP)

( * ) Notice: Subject to any disclaimer, the term of this patent is extended or adjusted under 35 U.S.C. 154(b) by 139 days.

(21) Appl. No.: 10/829,716

(22) Filed: Apr. 22, 2004

(65) Prior Publication Data

US 2004/0211269 A1    Oct. 28, 2004

(30) Foreign Application Priority Data

Apr. 24, 2003    (DE) ................ 103 19 559

(51) Int. Cl.
*G01L 3/00*        (2006.01)
(52) U.S. Cl. .................................. 73/862.08
(58) Field of Classification Search . 73/862.08–862.13
See application file for complete search history.

(56) References Cited

U.S. PATENT DOCUMENTS 3,082,826 A * 3/1963 Doman et al. ............ 416/148
3,685,342 A * 8/1972 Gordon ............................ 73/9
5,404,108 A * 4/1995 Storar ......................... 324/546
2002/0043102 A1* 4/2002 Cordes ......................... 73/117

FOREIGN PATENT DOCUMENTS

SU           637736 A  * 12/1978

OTHER PUBLICATIONS

*Patent Abstracts of Japan*, Abstract of Japanese Patent No. 5-149803, "Apparatus and Method for Measuring Cogging Torque of Motor", Jun. 15, 1993.

* cited by examiner

*Primary Examiner*—Max Noori
(74) *Attorney, Agent, or Firm*—Lipsitz & McAllister, LLC

(57) ABSTRACT

A device for measuring torque on an electric motor, which has a first motor portion and a second motor portion, which are rotatable in relation to each other, is proposed, the device comprising a rotatable holding plate for receiving the first motor portion, by means of which plate a rotational movement of the first motor portion in relation to the second motor portion can be driven, and a holding device for the second motor portion for holding the second motor portion in a rotationally fixed manner, the holding plate being disposed and formed in such a way that, when external forces are exerted on the electric motor via the holding device, the electric motor can position itself in relation to the holding device in such a way that external forces influencing the torque measurement are minimized.

29 Claims, 3 Drawing Sheets

DEVICE AND METHOD FOR MEASURING TORQUE ON AN ELECTRIC MOTOR

The present disclosure relates to the subject matter disclosed in German application No. 103 19 559.9 of Apr. 24, 2003, which is incorporated herein by reference in its entirety and for all purposes.

BACKGROUND OF THE INVENTION

The invention relates to a device and a method for measuring torque on an electric motor, the electric motor having a first motor portion and a second motor portion, which are rotatable in relation to each other.

The first motor portion and the second motor portion in this case are comprised by a stator-rotor combination.

Bearing friction and cogging are typical characteristics of an electric motor that can be determined by means of measuring the torque. Low-power motors, such as for example hard disk motors, have small geometrical dimensions and low masses. The forces acting are therefore very small.

SUMMARY OF THE INVENTION

In accordance with the invention, a device and a method for measuring torque on an electric motor are provided by which the torque can be determined with a high level of accuracy.

This is achieved by providing a rotatable holding plate for receiving the first motor portion, by means of which plate a rotational movement of the first motor portion in relation to the second motor portion can be driven, and by providing a holding device for the second motor portion for holding the second motor portion in a rotationally fixed manner, the holding plate being disposed and formed in such a way that, when external forces are exerted on the electric motor via the holding device, the electric motor can position itself in relation to the holding device in such a way that external forces influencing the torque measurement are minimized.

To be able to measure a torque on an electric motor, in principle the electric motor must be clamped. Clamping has the effect that external forces that may influence the torque measurement are exerted on the electric motor. A torque which is made up of an intrinsic component and a component induced by external forces is then measured. Only the intrinsic component characterizes the electric motor. The smaller the intrinsic component of the torque is, the greater the effect the external forces have. In the case of low-power motors, small forces act, with the result that the intrinsic torques may be small here. The device according to the invention allows the influence of external forces on the torque measurement to be minimized, i.e. the component of the torque measured that is attributable to external forces can be minimized.

This is achieved according to the invention by the holding plate being disposed and formed in such a way that, when external forces are exerted on the electric motor via the holding device, the electric motor can position itself in relation to the holding device in such a way that external forces influencing the torque measurement are minimized.

The electric motor can be newly positioned with respect to the holding device, the external forces being reduced in the new position. The new positioning of the electric motor in this case takes place automatically. This allows prestressing forces which are exerted due to the clamping of the electric motor to be reduced or eliminated. Furthermore, forces, in particular transverse forces, caused by canting when the electric motor is clamped, can be reduced or compensated.

The device according to the invention consequently allows an accurate measurement with respect to the intrinsic torque of the electric motor to be carried out, it being possible for the measurement to be automated. The device according to the invention allows the effect to be achieved that the same conditions exist when measurements are performed on different electric motors, with the result that good comparison between the measurement results is possible.

In particular, the holding plate is formed in such a way that the electric motor is displaceable on it. This allows the electric motor to yield to transverse forces, which are caused for example by canting during fixing on the holding device.

This can be achieved in a simple way if the holding plate has a polished surface on a supporting side for the first motor portion. A torque is transferred to the first motor portion via the holding plate by means of friction, in order to set said motor portion in a rotational movement. The polished surface can also achieve the effect, however, that the first motor portion (and consequently the entire electric motor) can be positioned on the holding plate in such a way that transverse forces are minimized.

It is most particularly advantageous if the holding plate is disposed in such a way that it can yield to axial forces with respect to an axis of rotation of the electric motor. In principle, the electric motor must be clamped between the holding device and the holding plate to allow a torque measurement to be carried out. This may result in axial prestressing, which can in principle influence the torque measurement. Since it is provided according to the invention that the holding plate can yield to such prestressing forces, the extent to which the electric motor is subjected to external axial forces can be minimized, in order in this way to be able to minimize the non-intrinsic component of the torque during the torque measurement.

The mobility of the holding plate can be achieved in a structurally simple way if it is spring-mounted. Such spring mounting ensures that, if axial prestressing is exerted on the electric motor, the latter can be fixed on the holding device with respect to the axial direction such that it is largely free from forces, or at least with minimized prestressing forces.

In particular, a direction of displacement of the holding plate lies substantially parallel to the direction of gravitational force.

It is most particularly advantageous if the holding plate is mounted on an air bearing. This allows a low-vibration rotational movement of the holding plate to be achieved, with external forces that are exerted on the electric motor via the holding plate and influence the torque measurement being minimized in particular.

It has proven to be advantageous if the holding plate can be driven at a rotational speed below 20 revolutions per minute, in particular below 10 revolutions per minute. Preferably, the speed at which the holding plate is driven lies in the range between 3 and 6 revolutions per minute. In particular, cogging can be accurately measured at such relatively low speeds.

To achieve these relatively low rotational speeds, it has proven to be advantageous if the holding plate is driven by means of a belt drive. Conventional DC motors which drive the holding plate by means of the belt drive can be used.

A holding unit for the first motor portion, which comprises the holding plate, is preferably mounted by way of an air bearing, in order in this way to be able to minimize vibrations in particular.

In particular, the belt drive drives an element which is mounted by way of an air bearing and on which the holding plate rests. A rotating part of the air bearing is then driven, this rotating part being connected to the holding plate in a rotationally fixed manner.

To measure the torque which is exerted via the rotation of the first motor portion, a torque sensor is advantageously disposed on the holding device. This torque sensor is then connected to the second motor portion in a rotationally fixed manner.

A coupling is provided for fixing the second motor portion on the holding device in a rotationally fixed manner. The fixing can be achieved in a simple way if the second motor portion is magnetically coupled to the torque sensor. In particular, a permanent magnet is provided for this purpose.

It is particularly advantageous if the holding device comprises a universal joint. This allows the effect to be achieved that the holding device can yield via the pivot axes of the universal joint, in order in this way to reduce canting effects when the electric motor is clamped. The pivot axes in this case lie in particular transversely and preferably at right angles to an axis of rotation of the electric motor.

It has proven to be advantageous if the rotor is held on the holding device in a rotationally fixed manner and the stator is set in rotational movement in relation to the rotor. The first motor portion is then the stator of the electric motor and the second motor portion is the rotor of the electric motor.

Furthermore, it is advantageous if the holding device is vertically displaceable. This allows the electric motor to be clamped and unclamped in a simple way. For example, the vertical displacement can be pneumatically actuated.

Furthermore, it is advantageous if an evaluation device is provided for the measurement results of a torque sensor, by means of which device the friction torque and/or the cogging of the electric motor can be determined. The evaluation device is realized for example by means of a PC. It can then display the measurement results directly in a user-friendly form or print them out as verification; similarly, the measurement results can be stored in a simple way.

In accordance with the invention, a method for measuring torque on an electric motor is provided, comprising rotating the first motor portion and holding the second motor portion in a rotationally fixed manner, with the torque being measured at the second motor portion. The first motor portion is held in a movable manner in such a way that, when external forces are exerted on the electric motor, the latter can position itself in such a way that disturbing forces influencing the torque measurement are minimized.

The method according to the invention has the advantages already explained in connection with the device according to the invention.

Further advantageous embodiments have likewise already been explained in connection with the device according to the invention.

In particular, it is provided that the first motor portion is held such that it is displaceable parallel to the direction of the axis of rotation of the electric motor. This allows prestressing forces that are exerted due to the clamping of the electric motor to be compensated.

Furthermore, it is advantageous if the first motor portion is held such that it is displaceable transversely to the direction of the axis of rotation of the electric motor. This allows forces, in particular transverse forces, attributable to the electric motor being clamped in a canted manner to be reduced.

In particular, the bearing friction and/or the cogging of the electric motor are determined. As a result, direct information on the intrinsic characteristics of the electric motor is obtained.

The measurement results are preferably corrected by the first harmonic. The first harmonic describes the component in the torque measurement that is attributable to an axial offset. Correction by the first harmonic directly produces a torque which characterizes the bearing friction and the cogging.

An evaluation of the measurement results is preferably carried out when stable measured values have been established, i.e. when the electric motor has "warmed up".

The description which follows of a preferred embodiment serves in connection with the drawing for a more detailed explanation of the invention.

DETAILED DESCRIPTION OF THE INVENTION

Figure 1:
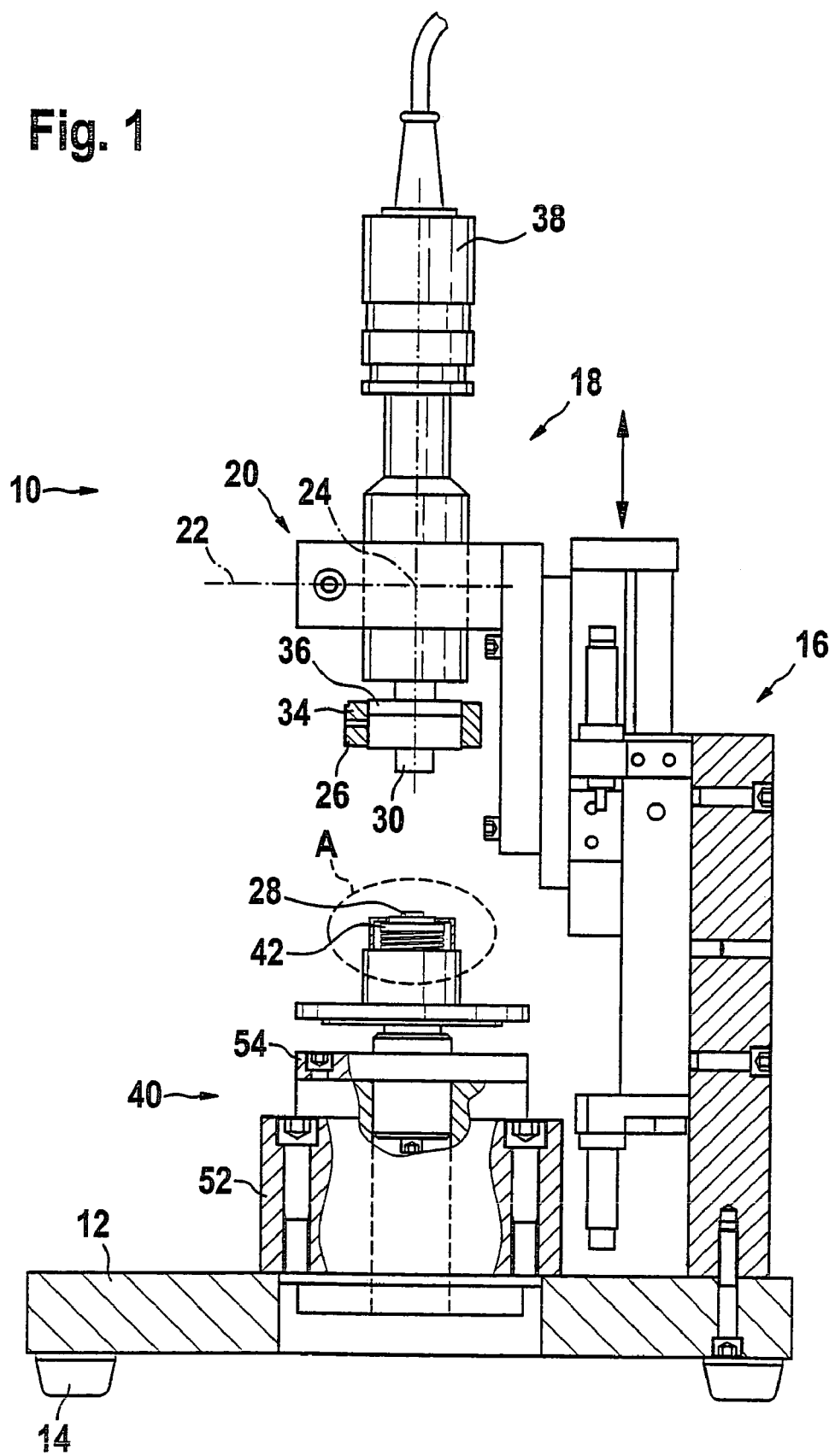
FIG. 1 shows a schematic lateral sectional view of an exemplary embodiment of a device according to the invention for measuring the torque on an electric motor.
Figure 2:
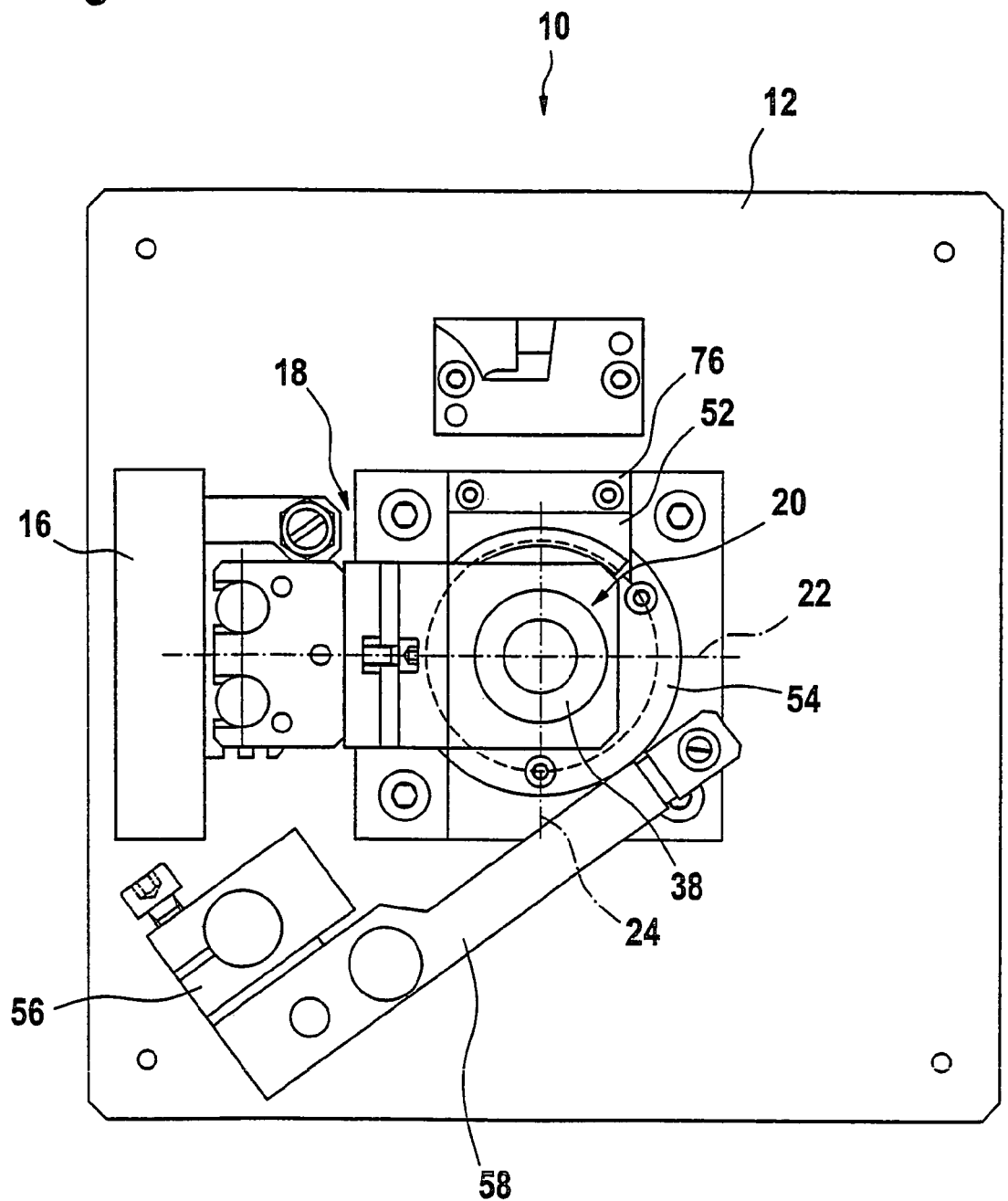
FIG. 2 shows a plan view of the device according to FIG. 1.

An exemplary embodiment of a device according to the invention for measuring torque on an electric motor, which device is shown in FIGS. 1 and 2 and is designated there as a whole by 10, comprises a base plate 12, which rests on an underlying surface by means of supporting feet 14. The underlying surface is in this case located in an environment where there is as little vibration as possible, and the base plate 12 is formed and mounted by means of the supporting feet 14 in such a way that vibrations influence the torque measurement as little as possible.

On the base plate 12 there rests a frame 16, which carries a holding device 18. The frame 16 extends away from the base plate 12 in a vertical direction. If the base plate 12 is set up horizontally on the underlying surface, the vertical direction is substantially parallel to the direction of gravitational force.

The holding device 18 is displaceable in the vertical direction, with pneumatic actuation being used for example to provide the displaceability.

The holding device 18 comprises a universal joint 20 with pivot axes 22 and 24, which lie transversely, in particular perpendicularly, to the vertical direction. The two pivot axes 22 and 24 are at right angles to each other. The universal joint 20 is in this case disposed on the holding device 18 in such a way that, with respect to the vertical direction, the point of intersection of the two pivot axes 22 and 24 lies above a central region of the base plate 12.

On the universal joint 20 there is, facing the base plate 12, a coupling 26, by means of which an electric motor 28 can be fixed as a test piece on the holding device 18. The coupling 26 comprises for example a permanent magnet 30, by means of which a second motor portion 32 (FIG. 3), which is in particular the rotor of the electric motor 28, can be fixed on the holding device 18 in a rotationally fixed manner by means of the coupling 26.

To set a weight with which the holding device 18 acts on the electric motor 28, the coupling 26 has a receptacle 34, in which one or more weighting rings 36 can be placed. The mass of the weighting ring or rings 36 is in this case adapted to the spring constant of a spring, which is described in still more detail further below.

Disposed on the holding device 18 is a torque sensor 38, by means of which the torque exerted on the second motor portion 32 (in particular the rotor of the electric motor 28) can be determined. The corresponding measurement results are passed on to an evaluation device, which is formed for example by a PC.

The electric motor 28 rests on a rotatably driven holding unit 40 above the base plate 12. This holding unit 40 comprises a holding plate 42, on which the electric motor is placed with a first motor portion 44. The first motor portion 44 is, in particular, the stator of the electric motor 28. The two motor portions 32 and 44 (rotor and stator) are rotatable in relation to each other about an axis of rotation 46, the axis of rotation of the electric motor 28. The electric motor 28 is in this case disposed in the device 10 in such a way that the axis of rotation 46 is substantially parallel to the vertical direction. The point of intersection of the pivot axes 22, 24 of the universal joint 20 lies substantially in the extension of the axis of rotation 46 of the electric motor 28.

The holding plate 42 is rotatably driven, so that the first motor portion 44 can be set in rotation via the holding plate 42. The torque is in this case transferred to the first motor portion 44 by friction. An axis of rotation 48 of the holding plate 42 coincides substantially with the axis of rotation 46 of the electric motor 28.

The holding plate 42 rests on a static air bearing 52, a rotating part 54 of this air bearing 52 being connected to the holding plate 42 in a rotationally fixed manner.

The air bearing 52 is driven by means of a DC motor 56, so that the rotating part 54 of the air bearing 52 can rotate about the axis of rotation 48. A belt drive 58 is provided in this case, so that the torque of the DC motor 56 is transferred to the rotating part 54 via a belt (FIG. 2). This allows the rotating part 54 to be driven at low speeds, which are in particular below 20 revolutions per minute and preferably between 3 and 6 revolutions per minute.

Figure 3:
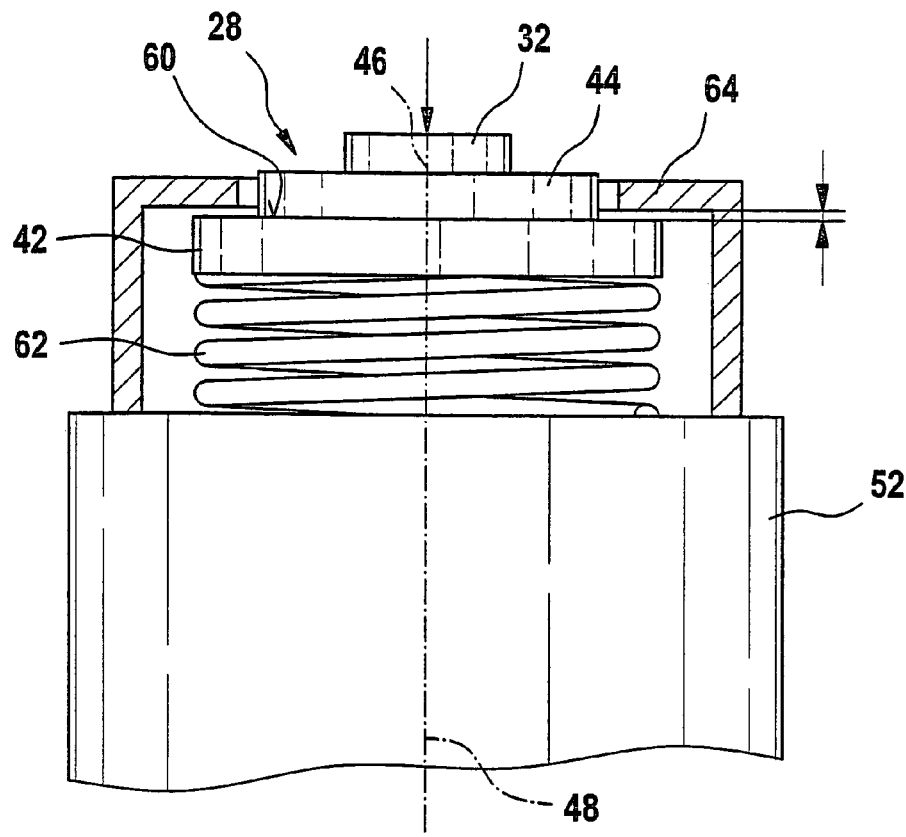
FIG. 3 shows an enlarged representation of the region A according to FIG. 1.

The holding plate 42 has a polished surface 60 (FIG. 3). The first motor portion 44, in particular the stator of the electric motor 28, rests on this surface 60. If lateral forces are exerted on the electric motor 28, i.e. forces transversely to the axis of rotation 46, the polished surface 60 allows the electric motor 28 to position itself on the holding plate 42 in such a way that the forces are minimized. On account of the polished surface 60, the electric motor 28 can be displaced on the holding plate 42.

The holding plate 42 is spring-mounted by means of a spring 62, which is in particular a compression spring. The spring 62 is in this case supported in particular on the rotating part 54. As a result, the holding plate 42 is mounted such that it is movable in a direction of displacement coaxial to the axis of rotation 48.

A stop flange 64, which is formed for example in an annular manner, limits the displaceability of the holding plate 42 in the direction of the coupling 26. Displaceability in the opposite direction is allowed when force is applied.

The device according to the invention and the method according to the invention function as follows:

The electric motor 28 is placed as a test piece onto the holding plate 42. The holding device 18 is displaced in the vertical direction toward the electric motor 28 and a rotationally fixed connection of the second motor portion 32 (in particular the rotor of the electric motor 28) to the holding device 18 is provided by means of the coupling 26. The holding device is in this case aligned in its longitudinal axis (which runs through the point of intersection of the pivot axes 22 and 24 of the universal joint 20) at least approximately coaxially in relation to the axis of rotation 46 of the electric motor 28.

The holding device 18 exerts a weight on the electric motor 28. This weight can be set by means of the weighting ring or rings 36. It is adapted to the spring constant of the spring 62.

This coupling of the holding device 18 causes the holding plate 42 to be displaced in the direction of the base plate 12 until an equilibrium of forces is established between the weight and the spring force of the spring 62.

The rotating part 54 is set in a slow rotational movement, typical speeds that have proven to be advantageous lying for example between 3 revolutions per minute and 6 revolutions per minute. As a result, the first motor portion 44 (the stator of the electric motor 28) is likewise set in a rotational movement. The second motor portion 32 is held in a rotationally fixed manner on the coupling 26 of the holding device 18. The rotation of the holding plate 42 then has the effect that the first motor portion 44 is rotated in relation to the second motor portion 32. The torque acting as a result is measured by means of the torque sensor 38.

The coupling of the holding device 18 has the effect that a prestress that can in principle influence the measurement result is exerted on the electric motor 28. However, the influence of this prestress is minimized by the spring mounting of the holding plate 42 according to the invention, since the corresponding moveability of the holding plate 42 allows the electric motor 28 to yield in the vertical direction when this force is applied.

When the electric motor 28 is positioned on the holding plate 42, it generally cannot be ensured that the axis of rotation 46 of the electric motor 28 and the longitudinal axis of the holding device 18 are coaxial. During the rotation of the holding plate 42, forces, in particular transverse forces, that in principle influence the measurement result can therefore occur on the electric motor 28 as a result of the fixing on the holding device 18. The way in which the holding plate 42 is formed according to the invention with a polished surface 60 allows the electric motor 28 to be newly positioned on the holding plate 42, so that such transverse forces are minimized.

The universal joint 20 according to the invention ensures that a lack of alignment of the axis of rotation 46 of the electric motor 28 and a longitudinal axis of the torque sensor 38 that can occur when the second motor portion 32 of the electric motor 28 is fixed on the coupling 26 of the holding device 18 is compensated.

Consequently, the device according to the invention and the method according to the invention allow forces caused by the clamping of the electric motor 28 to be minimized, in order to be able to minimize their influence on the torque measurement.

According to the invention, this allows measurements to be performed even on small electric motors, in which small masses are moved and small forces act, such as for example hard disk motors with fluid bearings.

The measurements can be automated. The same measuring conditions can be created for measuring on different electric motors 28.

The measurement is evaluated when stable values have been established, i.e. the measurement is preferably performed when the electric motor 28 is in an "operationally warm" state.

The evaluation device can be used in particular to measure the bearing friction of the electric motor 28 and the cogging corresponding to the magnetic detent torque of the electric motor 28. Cogging is the magnetic detent torque between the first motor portion 44 and the second motor portion 32 in relation to each other, which is attributable to the magnetic field in the electric motor 28 not acting uniformly over the circumference of the intermediate region between the stator and the rotor.

Figure 4:
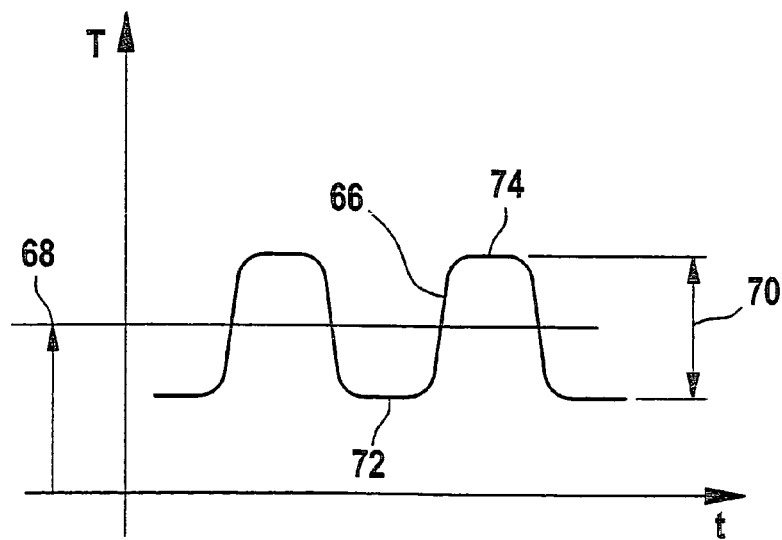
FIG. 4 shows a measurement result of the torque measurement (corrected by the first harmonic).

A corresponding measurement result of the torque T is represented in FIG. 4 as a function of time t, correction by the first harmonic having already been carried out. The first harmonic is attributable to an axial offset. A typical order of magnitude of such an axial offset in the case of hard disk motors is in the micrometer range.

In the diagram of FIG. 4, a periodic curve waveform 66 about a mean value 68 can be seen. This mean value 68 is a measure of the bearing friction of the electric motor 28. A typical order of magnitude of this friction torque in the case of hard disk motors is 100 μNm.

The distance 70 between a minimum 72 and a maximum 74 of the curve waveform 66 is the magnetic detent torque (cogging). This distance 70 corresponds to the difference in torque between a minimum pole pitch and a maximum pole pitch. This difference in torque allows an electric motor to be rotated into an undetermined state, so that its determination is of decisive importance for the determination of the characteristics of the electric motor 28.

Also provided, as shown in FIG. 2, is an angle-of-rotation sensor 76 (encoder), which measures the angle of rotation of the rotating part 54 and passes this measurement result on to the evaluation device. This then allows the evaluation device to determine the torque as a function of the angle of rotation or as a function of time.

LIST OF REFERENCE NUMBERS

10 device
12 base plate
14 supporting foot
16 frame
18 holding device
20 universal joint
22 pivot axis
24 pivot axis
26 coupling
28 electric motor
30 permanent magnet
32 second motor portion
24 receptacle
36 weighting ring
38 torque sensor
40 holding unit
42 holding plate
44 first motor portion
46 axis of rotation
48 axis of rotation
52 air bearing
54 rotating part
56 motor
58 belt drive
60 surface
62 spring
64 stop flange
66 curve waveform
68 mean value
70 distance
72 minimum
74 maximum
76 angle-of-rotation sensor

The invention claimed is:

1. Device for measuring torque on an electric motor, said electric motor having a first motor portion and a second motor portion being rotatable in relation to each other, comprising:
    a rotatable holding plate for receiving the first motor portion, by means of which plate a rotational movement of the first motor portion in relation to the second motor portion is driveable; and
    a holding device for the second motor portion for holding the second motor portion in a rotationally fixed manner;
    wherein the holding plate is disposed and formed in such a way that, when external forces are exerted on the electric motor via the holding device, the electric motor can position itself in relation to the holding device in such a way that external forces influencing the torque measurement are minimized.

2. Device according to claim 1, wherein the holding plate is formed in such a way that the electric motor is displaceable on it.

3. Device according to claim 1, wherein the holding plate has a polished surface on a supporting side for the first motor portion.

4. Device according to claim 1, wherein the holding plate is disposed in such a way that it can yield to axial forces with respect to an axis of rotation of the electric motor.

5. Device according to claim 1, wherein the holding plate is spring-mounted.

6. Device according to claim 4, wherein a direction of displacement of the holding plate is substantially parallel to the direction of gravitational force.

7. Device according to claim 1, wherein the holding plate is mounted on an air bearing.

8. Device according to claim 1, wherein the holding plate is driveable at a rotational speed below 20 revolutions per minute.

9. Device according to claim 1, wherein the holding plate is driven by means of a belt drive.

10. Device according to claim 1, wherein a holding unit, which comprises the holding plate, is mounted by way of an air bearing.

11. Device according to claim 1, wherein a torque sensor is disposed on the holding device.

12. Device according to claim 11, wherein the second motor portion is magnetically coupled to the torque sensor.

13. Device according to claim 1, wherein the holding device comprises a universal joint.

14. Device according to claim 1, wherein the first motor portion is the stator of the electric motor.

15. Device according to claim 1, wherein the second motor portion is the rotor of the electric motor.

16. Device according to claim 1, wherein the holding device is vertically displaceable.

17. Device according to claim 1, wherein an evaluation device is provided for the measurement results of a torque sensor, by means of which device the friction torque and/or the cogging of the electric motor can be determined.

18. Method for measuring torque on an electric motor, said electric motor having a first motor portion and a second motor portion being rotatable in relation to each other, comprising:
- rotating the first motor portion and holding the second motor portion in a rotationally fixed manner;
- measuring the torque at the second motor portion; and
- holding the first motor portion in a movable manner in such a way that, when forces are exerted on the electric motor, the latter can position itself in such a way that disturbing forces influencing the torque measurement are minimized.

19. Method according to claim 18, wherein the first motor portion is held such that it is displaceable parallel to the direction of the axis of rotation of the electric motor.

20. Method according to claim 18, wherein the first motor portion is held such that it is displaceable transversely to the direction of the axis of rotation of the electric motor.

21. Method according to claim 18, wherein the second motor portion is connected to a torque sensor by means of a universal joint.

22. Method according to claim 18, wherein the second motor portion is magnetically held.

23. Method according to claim 18, wherein the first motor portion is driven in its rotational movement while mounted by way of an air bearing.

24. Method according to claim 18, wherein the first motor portion is driven at a low speed.

25. Method according to claim 24, wherein the first motor portion is driveable at a speed of less than 10 revolutions per minute.

26. Method according to claim 18, wherein the first motor portion is the stator and the second motor portion is the rotor.

27. Method according to claim 18, wherein at least one of bearing friction and cogging of the electric motor are determined.

28. Method according to claim 27, wherein the measurement results are corrected by the first harmonic.

29. Method according to claim 27, wherein an evaluation of the measurement results is carried out when stable measured values have been established.

\* \* \* \* \*